(12) United States Patent
Palally et al.

(10) Patent No.: US 12,382,401 B2
(45) Date of Patent: *Aug. 5, 2025

(54) POWER BUDGET CALCULATION USING POWER HEADROOM

(71) Applicant: Parallel Wireless, Inc., Nashua, NH (US)

(72) Inventors: Hemanth Palally, Bangalore (IN); Biswajeet Kumar, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,255

(22) Filed: Jan. 16, 2024

(65) Prior Publication Data
US 2024/0155506 A1   May 9, 2024

Related U.S. Application Data

(63) Continuation of application No. 17/517,605, filed on Nov. 2, 2021, now Pat. No. 11,877,248, which is a continuation of application No. 16/751,902, filed on Jan. 24, 2020, now Pat. No. 11,166,240.

(60) Provisional application No. 62/796,260, filed on Jan. 24, 2019.

(51) Int. Cl.
*H04W 52/24* (2009.01)
*H04W 72/0446* (2023.01)
*H04W 72/23* (2023.01)
*H04W 72/52* (2023.01)
*H04W 72/54* (2023.01)

(52) U.S. Cl.
CPC ....... *H04W 52/246* (2013.01); *H04W 52/241* (2013.01); *H04W 72/0446* (2013.01); *H04W 72/23* (2023.01); *H04W 72/52* (2023.01); *H04W 72/54* (2023.01)

(58) Field of Classification Search
CPC ............. H04W 52/246; H04W 52/241; H04W 72/042; H04W 72/0446; H04W 72/0486; H04W 72/08; H04W 72/23; H04W 72/52; H04W 72/54; H04W 52/365; H04W 52/223; H04W 52/225; H04W 52/228; H04W 52/22
See application file for complete search history.

(56) References Cited

U.S. PATENT DOCUMENTS

| | | | |
|---|---|---|---|
| 11,166,240 B2 * | 11/2021 | Palally | H04W 52/365 |
| 11,877,248 B2 * | 1/2024 | Palally | H04W 72/54 |
| 2013/0148619 A1 * | 6/2013 | Ahn | H04W 72/04 370/329 |
| 2014/0036799 A1 * | 2/2014 | Bharadwaj | H04L 1/0027 370/329 |
| 2015/0111608 A1 * | 4/2015 | Kazmi | H04W 52/367 455/522 |

(Continued)

*Primary Examiner* — Angelica Perez
(74) *Attorney, Agent, or Firm* — Michael Y. Saji

(57) ABSTRACT

Methods and computer software are disclosed for determining a power budget for physical channels in a system. The method may include, obtaining a mean and variance of a previously computed power component; determining an estimate of a current power component in a current frame based on the mean and variance of the previously computed power component; and computing a power budget in a current frame using the estimate of the current power component.

18 Claims, 5 Drawing Sheets

(56) References Cited

U.S. PATENT DOCUMENTS

2019/0200363 A1\* 6/2019 Rajendran ............. H04W 52/16

\* cited by examiner

POWER BUDGET CALCULATION USING POWER HEADROOM

CROSS-REFERENCE TO RELATED APPLICATIONS

This application is a continuation of U.S. application Ser. No. 17/517,605, filed Nov. 11, 2021, which is a continuation of U.S. application Ser. No. 16/751,902, filed Jan. 24, 2020, which claims priority under 35 U.S.C. § 119(e) to U.S. Provisional Pat. App. No. 62/796,260, filed Jan. 24, 2019, titled "HSDPA Power Budget Calculation Based on Non-HSDPA Power Headroom," each of which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, US02, US03, 71710US01, 71721US01, 71729US01, 71730US01, 71731US01, 71756US01, 71775US01, 71865US01, and 71866US01, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

An overall transmitted signal from a NodeB can be resolved in to three major components, namely: R99 Physical Channels, HSDPA Physical Channels, and HSUPA DL Physical Channels. The power available for the High-Speed Downlink Packet Access (HSDPA) physical channels determines the amount and quality of HSDPA data that can be scheduled in the downlink. The available HSDPA Power in a given frame is the power remaining after the assigning the power for R99 and High-Speed Uplink Packet Access (HSUPA)_DL channels. The below equation defines this as:

$$\text{HSDPA Budget Power} = \text{MaxTransmitPower} - R99\_\text{Power} - \text{HSUPA\_DL\_Power}$$

SUMMARY

Methods and computer software are disclosed for determining a power budget for physical channels in a system. In one embodiment, the method may include, obtaining a mean and variance of a previously computed power component; determining an estimate of a current power component in a current frame based on the mean and variance of the previously computed power component; and computing a power budget in a current frame using the estimate of the current power component.

In some embodiments the power budget is for High-Speed Downlink Packet Access (HSDPA) physical channels in a Wideband Code Division Multiple Access (WCDMA) system.

In another embodiment, a non-transitory computer-readable medium contains instructions for determining a power budget for physical channels in a system. The non-transitory computer-readable medium may include instructions for obtaining a mean and variance of a previously computed power component; determining an estimate of a current power component in a current frame based on the mean and variance of the previously computed power component; and computing a power budget in a current frame using the estimate of the current power component.

DETAILED DESCRIPTION

Figure 1:
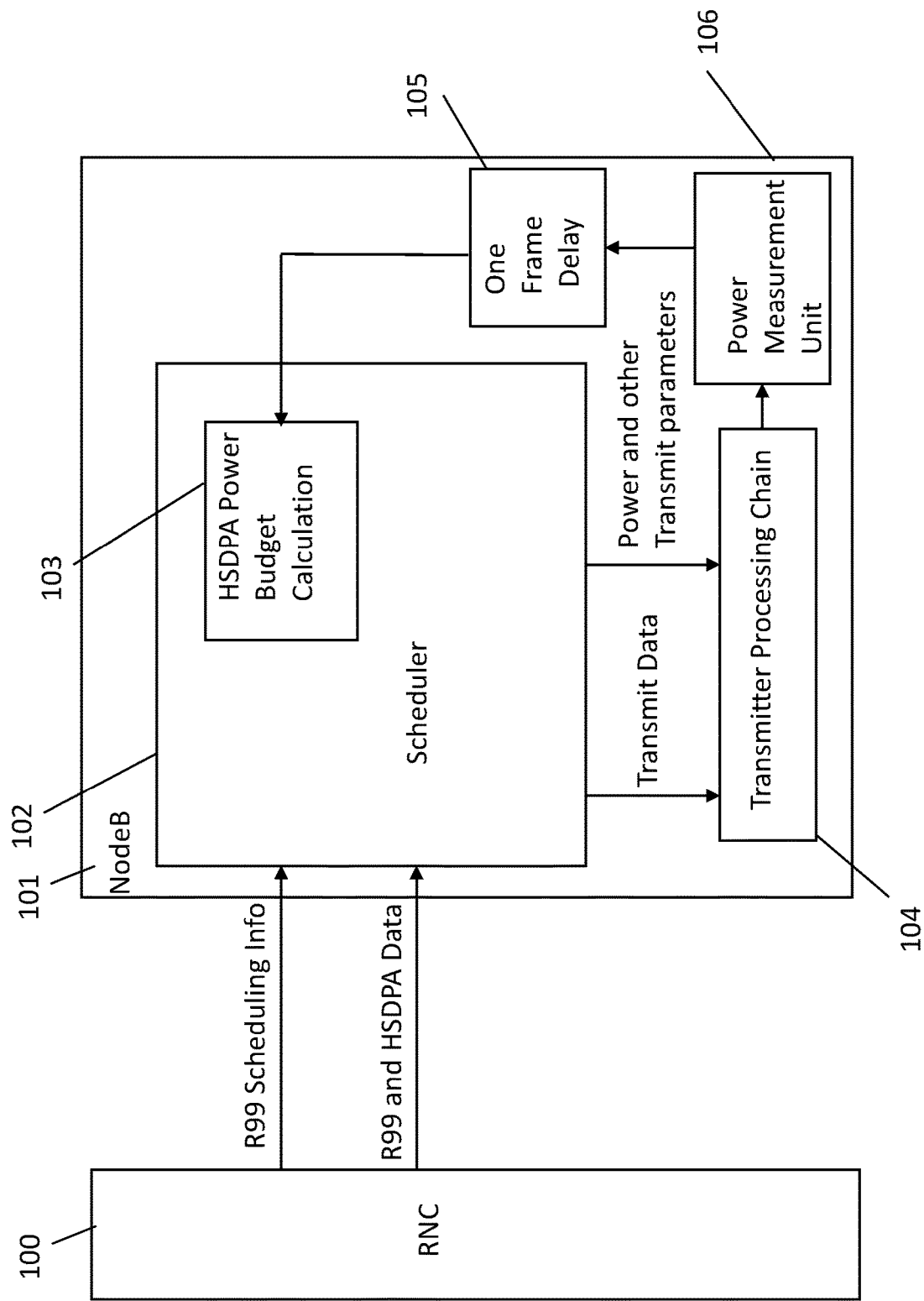
FIG. 1 is a system diagram showing components for providing a power budget for High-Speed Downlink Packet Access (HSDPA) physical channels in a Wideband Code Division Multiple Access (WCDMA) system, in accordance with some embodiments.

A method is disclosed to optimally compute the Power budget for HSDPA Physical Channels in WCDMA System. This method helps to avert the Saturation of overall Transmit power, which would disrupt the transmit signal and therefore affect all the active users. The method also avoids underutilization of the overall power and therefore helps to optimally use the available power to achieve optimal data throughput. This method uses the mean and variance of the previously computed non-hsdpa power component to estimate its value in the current frame. This estimate used to optimally compute the power budget for HSDPA in the current frame.

It is beneficial to dynamically determine how much variation we can expect in various power components and use the variation to allocate power effectively. This helps with two problems: avoidance of saturation on the downlink; and efficient use of downlink power. It is believed that underutilization of power or saturation lead to severe performance issues, which will be significantly mitigated by the present invention.

In some embodiments, the methods and systems described herein could be implemented on a base station. The base station includes various software components that run on processors, including baseband processors or general-purpose processors, which software components provide Layer 1 (L1), Layer 2 (L2), Layer 3 (L3), etc. functionality that is compliant with features required to be provided by a base station. The present disclosure anticipates that the methods and systems described herein could be implemented on a base station in software between an L1 and an L2 software module, or in conjunction with a monolithic (i.e., combined) L1 and L2.

It should also be appreciated that the methods and systems described herein could be used for any radio access technology (any "G"), including: 2G; 3G; 4G (LTE); and 5G, and is not limited to WCDMA nodeBs. In addition, the methods and systems described herein could be used for a multi-radio access technology (multi-RAT) node capable of more than one RAT and including, for example, WCDMA.

The Overall transmitted signal from NodeB can be resolved in to three major components, namely: R99 Physical Channels; HSDPA physical Channels; and HSUPA DL Physical Channels.

The power available for the HSDPA physical channels determines the amount and quality of HSDPA data that can be scheduled in the downlink.

The available HSDPA Power in a given frame is the power remaining after the assigning the power for R99 and HSUPA_DL channels.

The R99 physical channels are scheduled with a periodicity of 10 ms and therefore the HSDPA Power budget calculations must be done at the beginning of every 10 ms frame boundary.

Due to heavy processing load on the CPU and processing latencies, the power measurements of R99 and HSUPA_DL components of the current frame are not available for the NodeB scheduler. So HSDPA scheduler must estimate the current R99 and HSUPA_DL powers based on the previous measurement values.

In a typical implementation, this estimation is done by providing some headroom over the previous measured values.

Non_HSDP_Power=R99_Power+HSUPA_DL_Power

Non_HSDP_Power_currentFrame=headroom+ Non_HSDPA_Power_prevFrame

In the current implementation headroom values is chosen to be a certain percentage value of the previous measured value.

For example, headroom=30% of Non_HSDPA_Power_previousFrame

So,

Non_HSDPA_currentFrame=0.3*Non_HSDPA_Power_previousFrame+Non_HSDPA_Power_previousFrame Non_HSDP_Power_currentFrame=1.3* Non_HSDPA_Power_previousFrame The headroom is required to accommodate any rise in the Non_HSDPA_Power components form from previous frame to current frame due to R99 Power control and increase in HSUPA DL transmissions. However, having a static headroom as mentioned in the equation above poses two problems:

1. If the jump in the Non_HSDPA_Power is greater than the pre-defined Headroom, the Overall Power of the Transmit signal becomes greater than the maximum Transmit Power. As we do not have Automatic Gain Control (AGC) in our system, this results in severe distortion of the transmit signal and affects the performance of all the active users transmitting in the current frame.
2. If the pre-defined Headroom is much greater than the Non_HSDPA_Power, there will be underutilization of power and results in degraded data throughput.

FIG. 1 shows a system for performing HSDPA power budget calculations. A Radio Network Controller (RNC) 100 is in communication with a NodeB 101. NodeB 101 includes a scheduler 102 including an HSDPA Power budget calculation element 103. Node B 101 also includes a Transmitter Processing Chain 104 receiving transmit data and power and other transmit parameters from the Scheduler. The Transmitter Processing Chain is in communication with Power Measurement Unit 106 which is in communication with a one frame delay 105, which is in communication with the Scheduler.

Figure 2:
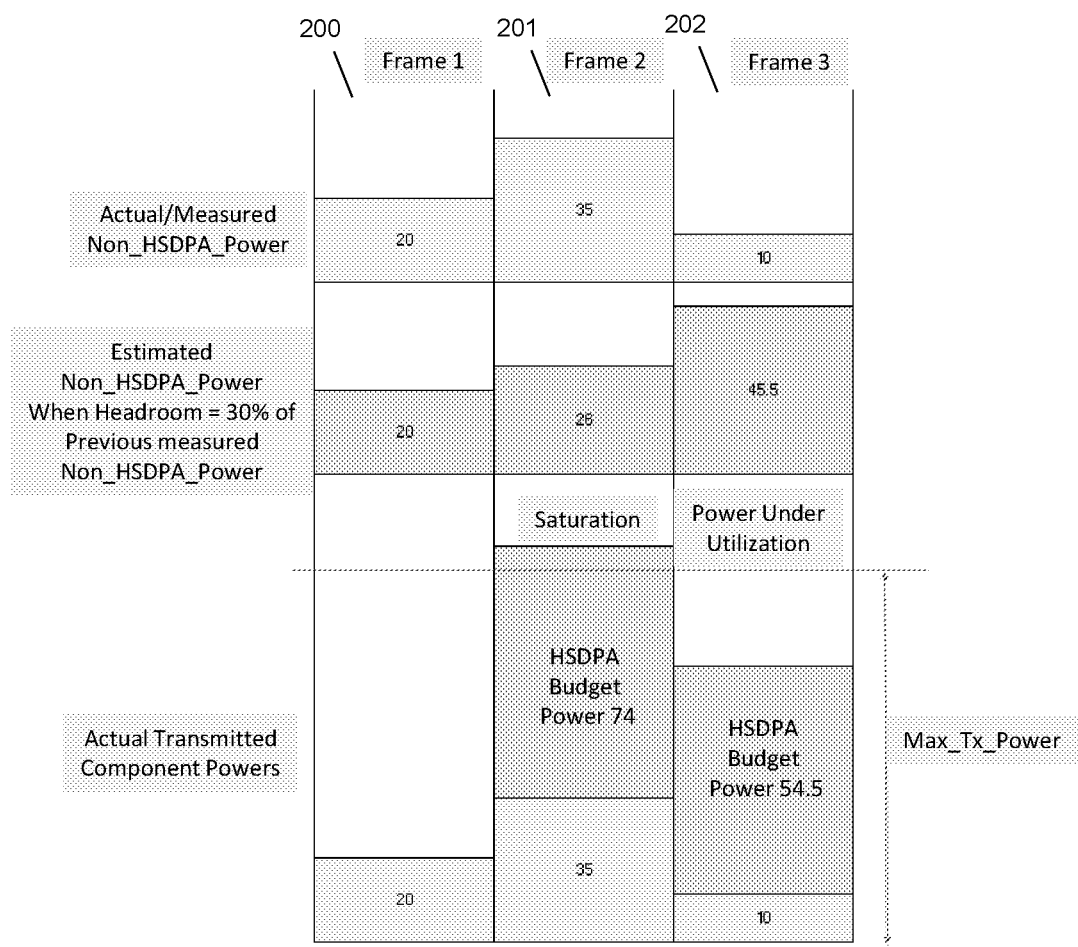
FIG. 2 is a diagram showing power for different frames, in accordance with some embodiments.

FIG. 2 shows three frames 200, 201 and 202. Frame 201 is in a saturation state, and frame 202 is in an under-utilized state.

Solution to Problem

Method 1:

Our invention is based upon the fact that total non-HS channel power for users in a cell is predictable for the upcoming frame. It is a random variable which is more or less white in nature with a Gaussian distribution as established in our experiments on an actual cell.

The prediction algorithm treats the non-HS channel power in the previous N frames as a random process and tries to predict the upcoming non-HS channel power using a linear predictor.

$x(i+1)\text{pred} = \sum_{j=0}^{N-1} h_j x(i-j)$

The estimate in the above equation requires the calculation of the optimum coefficients hj.

The optimal coefficients will minimize the mean square error (MSE) between the predicted and actual value and is obtained by solving the Weiner-Hoff equation.

$h = R^{-1} r$ where R is NXN autocorrelation matrix of previous N frame transmitted non-HS power.

The calculation of prediction coefficients requires generation and inversion of autocorrelation matrix.

Since initially the autocorrelation values are not available, the generation of the matrix R is done only after transmitting a few hundred frames and keeping a record of the power transmitted.

The prediction of the fade power in the (i+2)th frame is done by recursively using the equation whereby the past will now include the power of (i+1)th frame.

Once the predicted non-HS channel transmit power is available the budget for HSDPA data channel power can be evaluated.

Transmitted power of each frame here is taken as the average of power transmitted in the slots. There are 15 slots per frame.

Our invention helps in overcoming the two problems as mentioned in the previous section. It not only helps to avoid saturation in Downlink Transmit Signal, it also helps to optimally use the available power to reach maximum throughput.

Figure 3:
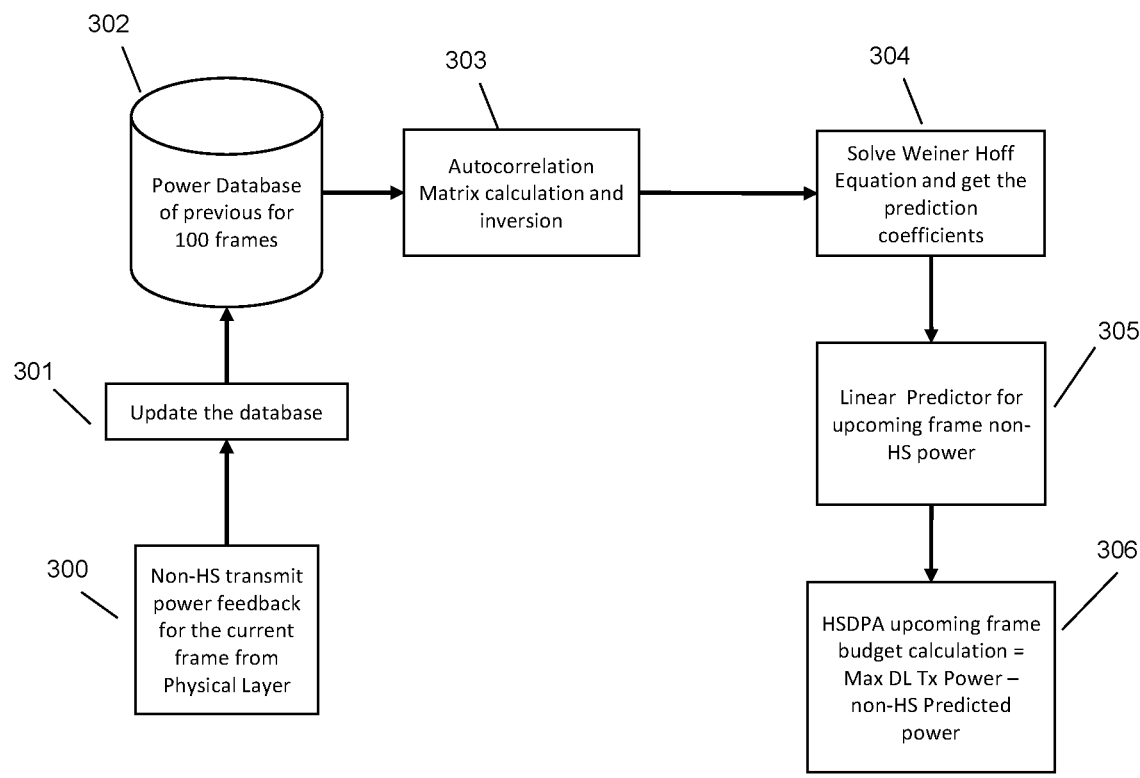
FIG. 3 is a flow diagram for providing a power budget for High-Speed Downlink Packet Access (HSDPA) physical channels in a Wideband Code Division Multiple Access (WCDMA) system, in accordance with some embodiments.

FIG. 3 is an architecture diagram showing a power database 302 of the previous 100 frames. The non-HS transmit power feedback for the current frame from the physical layer 300 is used to update the database 301. An autocorrelation matrix calculation and inversion 303 is applied to the latest output from the power database 302. An equation is solved 304 to get the prediction coefficients. These are fed to a linear predictor 305 for upcoming frame non-HS power. The HSDPA upcoming frame budget calculation is determined 306.

Figure 4:
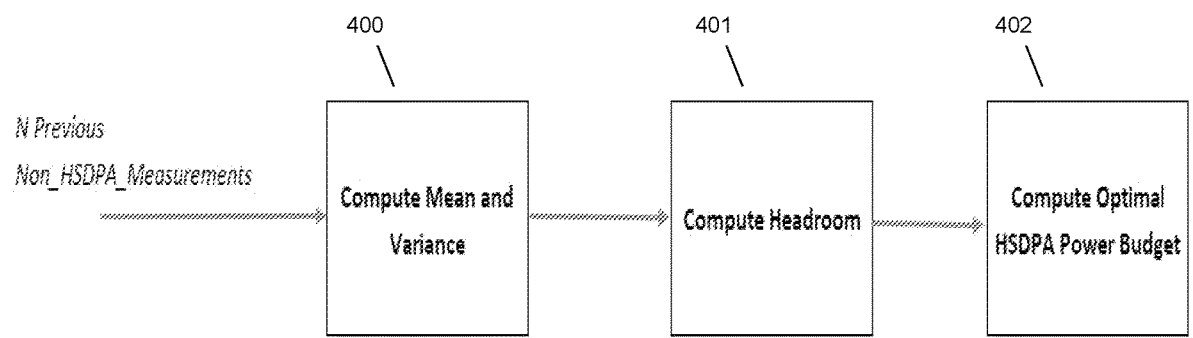
FIG. 4 is a diagram showing steps used for providing a power budget for High-Speed Downlink Packet Access (HSDPA) physical channels in a Wideband Code Division Multiple Access (WCDMA) system, in accordance with some embodiments.

FIG. 4 is a diagram showing steps used for providing a power budget for High-Speed Downlink Packet Access (HSDPA) physical channels in a Wideband Code Division Multiple Access (WCDMA) system. The mean and variance is computed 400, then the headroom is computed using the mean and variance 401, and then the optimal power budget 402 is determined.

In one embodiment, the invention dynamically computes the Headroom value very frame based on the statistics of the previous Non_HSDPA_Power values.

It is observed from the lab experiments that the Non_HSDPA_Power values are random in nature and have a probability distribution function that is close to Gaussian distribution with Mean $\mu$ and variance $\sigma^2$.

The values $\mu$ and $\sigma^2$ vary depending on many parameters like channel conditions, number of active users, HSUPA load, mobility of the users.

We compute the Headroom value as follows

Headroom=$\xi$*mean(Non_HSDPA_Power)

mean(Non_HSDPA_Power)=$\Sigma_{k=0}^{N-1}$Non_HSDPA_Power(k)

N defines the averaging period $\xi$=fn($\sigma^2$)

fn( ) is a function that derives based on the variance $\sigma^2$ of Non_HSDPA_Power Our invention helps in overcoming the two problems as mentioned in the previous section. It not helps to avoid saturation in Downlink Transmit Signal, it also helps to optimally use the available power to reach maximum throughput.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

Figure 5:
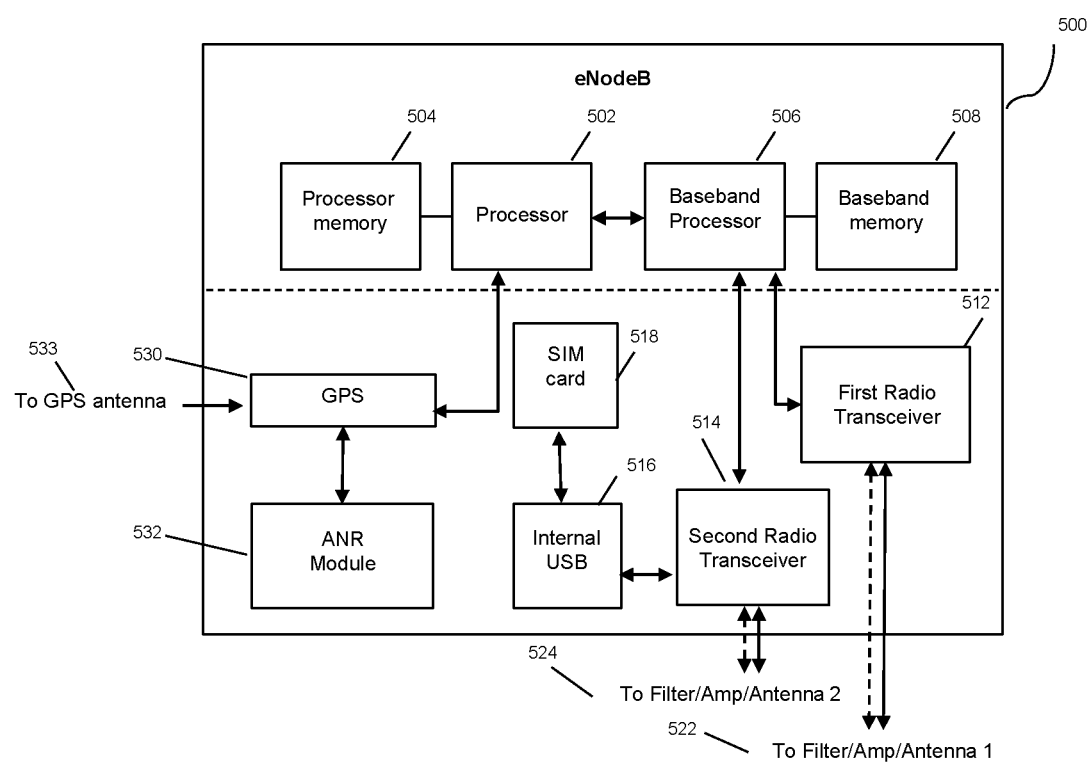
FIG. 5 is a diagram of an enhanced eNodeB for performing the methods described herein, in accordance with some embodiments.

FIG. 5 is an enhanced eNodeB for performing the methods described herein, in accordance with some embodiments. Mesh network node 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 530 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for determining a power budget for physical channels in a downlink system, comprising:
    receiving, at a transmit processing chain of a base station in the downlink system, power data from a base station scheduler;
    obtaining a mean and a variance of a previously computed power component of at least one immediately previous frame;
    determining an estimate of a current power component in a current frame based on the mean and the variance of the previously computed power component, and a Gaussian probability distribution function; and
    computing a power budget in a current frame using the estimate of the current power component.

2. The method of claim 1, wherein the determining an estimate of a current power component in a current frame based on the mean and the variance of the previously computed power component comprises multiplying a variance value by a mean of the current power component.

3. The method of claim 2, wherein determining the mean of the current power component comprises taking a summation for an averaging period of the current power measurement.

4. The method of claim 3, wherein determining the variance value comprises providing a function that derives the variance value based on a variance of the current power component.

5. A method for determining a power budget for High-Speed Downlink Packet Access (HSDPA) physical channels in a Wideband Code Division Multiple Access (WCDMA) system, comprising:
    receiving, at a transmit processing chain of a base station in the WCDMA system, power data from a base station scheduler;
    obtaining a mean and a variance of a previously computed non-HSDPA power component;
    determining an estimate of a current non-HSDPA power component in a current frame based on the mean and the variance of the previously computed non-HSDPA power component, and a Gaussian probability distribution function; and
    computing a power budget for HSDPA in a current frame using the estimate of the current non-HSDPA power component.

6. The method of claim 5 wherein the determining an estimate of a current power component in a current frame based on the mean and the variance of the previously computed power component comprises multiplying a variance value by a mean of the current power component.

7. The method of claim 6, wherein determining the mean of the current power component comprises taking a summation for an averaging period of the current power measurement.

8. The method of claim 7, wherein determining the variance value comprises providing a function that derives the variance value based on a variance of the current power component.

9. The method of claim 8, wherein the values of the mean and the variance vary depending on different parameters.

10. The method of claim 9, wherein the parameters include at least one of channel conditions, a number of active users, High Speed Uplink Packet Access (HSUPA) load, and a mobility of users.

11. The method of claim 5, wherein the power budget for High-Speed Downlink Packet Access (HSDPA) physical channels is determined for every frame.

12. A non-transitory computer-readable medium containing instructions for determining a power budget for physical channels in a cellular transceiver system, the instructions comprising:
    receiving, at a transmit processing chain of a base station in the cellular transceiver system, power data from a base station scheduler;
    obtaining a mean and a variance of a previously computed power component;
    determining an estimate of a current power component in a current frame based on the mean and the variance of the previously computed power component, and a Gaussian probability distribution function; and
    computing a power budget in a current frame using the estimate of the current power component.

13. The non-transitory computer-readable medium of claim 12, wherein the determining an estimate of a current power component in a current frame based on the mean and the variance of the previously computed power component comprises multiplying a variance value by a mean of the current power component.

14. The non-transitory computer-readable medium of claim 13, wherein determining the mean of the current power component comprises taking a summation for an averaging period of the current power measurement.

15. The non-transitory computer-readable medium of claim 14, wherein determining the variance value comprises providing a function that derives the variance value based on a variance of the current power component.

16. The non-transitory computer-readable medium of claim 15, wherein the power budget is for High-Speed Downlink Packet Access (HSDPA) physical channels in a Wideband Code Division Multiple Access (WCDMA) system.

17. The non-transitory computer-readable medium of claim 16, the instructions further comprising determining the power budget for High-Speed Downlink Packet Access (HSDPA) physical channels for every frame.

18. The non-transitory computer-readable medium of claim 17, wherein the values of the mean and the variance vary depending on different parameters, and wherein the parameters include at least one of channel conditions, a number of active users, High Speed Uplink Packet Access (HSUPA) load, and a mobility of users.

* * * * *